(12) United States Patent
Qattan et al.

(10) Patent No.: US 9,315,211 B2
(45) Date of Patent: Apr. 19, 2016

(54) SADDLE TYPE SELF-STEER AXLE SYSTEM

(75) Inventors: Jamal Umar Qattan, San Diego, CA (US); Montgomery Pike Burkhart, Paris, TX (US); Thomas A. Blagg, Paris, TX (US)

(73) Assignee: The Smart Wagon Corporation, Paris, TX (US)

( * ) Notice: Subject to any disclaimer, the term of this patent is extended or adjusted under 35 U.S.C. 154(b) by 282 days.

(21) Appl. No.: 13/594,631

(22) Filed: Aug. 24, 2012

(65) Prior Publication Data

US 2013/0049328 A1 Feb. 28, 2013

Related U.S. Application Data

(60) Provisional application No. 61/527,024, filed on Aug. 24, 2011.

(51) Int. Cl.
*B62D 13/06* (2006.01)
*B62D 7/14* (2006.01)
*B60G 7/00* (2006.01)
*B62D 17/00* (2006.01)
*B62D 13/04* (2006.01)

(52) U.S. Cl.
CPC ............... *B62D 13/06* (2013.01); *B60G 7/006* (2013.01); *B62D 7/146* (2013.01); *B62D 13/04* (2013.01); *B62D 17/00* (2013.01)

(58) Field of Classification Search
CPC .. B60G 2200/464; B60G 7/006; B62D 17/00; B62D 7/146
USPC .......................... 280/426, 86.751, 5.52, 5.521
See application file for complete search history.

(56) References Cited

U.S. PATENT DOCUMENTS

| | | | | |
|---|---|---|---|---|
| 2,785,909 A | * | 3/1957 | Barnard | 280/426 |
| 3,447,813 A | | 6/1969 | Wolf | |
| 4,120,509 A | * | 10/1978 | Reeve et al. | 280/81.6 |
| 4,195,863 A | * | 4/1980 | Richardson | 280/86.751 |
| 4,494,798 A | * | 1/1985 | Bailey | 298/17.6 |
| 4,770,430 A | | 9/1988 | Lange | |
| 4,824,135 A | | 4/1989 | McGregor | |
| 5,364,113 A | | 11/1994 | Goertzen | |
| 5,474,320 A | | 12/1995 | Bojarski et al. | |
| 6,007,078 A | * | 12/1999 | Gottschalk et al. | 280/86.751 |
| 6,036,217 A | * | 3/2000 | Burkhart et al. | 280/476.1 |

(Continued)

FOREIGN PATENT DOCUMENTS

| | | |
|---|---|---|
| EP | 0433030 A1 | 6/1991 |
| EP | 0905006 A2 | 3/1999 |
| WO | 2007128073 A1 | 11/2007 |

*Primary Examiner* — Kevin Hurley
*Assistant Examiner* — Michael Stabley
(74) *Attorney, Agent, or Firm* — Klemchuk LLP; Kirby B. Drake

(57) ABSTRACT

Saddle type self-steer axle systems equipped wagons may include two or more axles and may be backed up due to reversing caster. Such systems may provide increased stability by providing four points of contact. Further, such systems may provide improved weight distribution in that weight may be distributed over four points as opposed to three points. In addition, such systems may provide increased safety by raising the rollover threshold to that of the tow vehicle. Such systems may allow a tow vehicle to carry its full allowable gross weight while towing its full allowable tow weight. In addition, a centrally pivoting saddle style hinge system may reduce the actuator force that may be needed to change the caster from forward to reverse and vice versa.

15 Claims, 20 Drawing Sheets

(56) References Cited

U.S. PATENT DOCUMENTS

| | | | |
|---|---|---|---|
| 6,073,947 A * | 6/2000 | Gottschalk et al. | 280/124.128 |
| 6,293,570 B1 * | 9/2001 | Gottschalk et al. | 280/86.751 |
| 7,273,217 B2 | 9/2007 | Rudder et al. | |
| 7,866,680 B2 * | 1/2011 | Baldauf et al. | 280/81.6 |
| 2004/0188971 A1 | 9/2004 | Rudder et al. | |
| 2009/0199603 A1 * | 8/2009 | Baldauf et al. | 70/226 |
| 2011/0248115 A1 * | 10/2011 | Proia | 244/50 |

\* cited by examiner

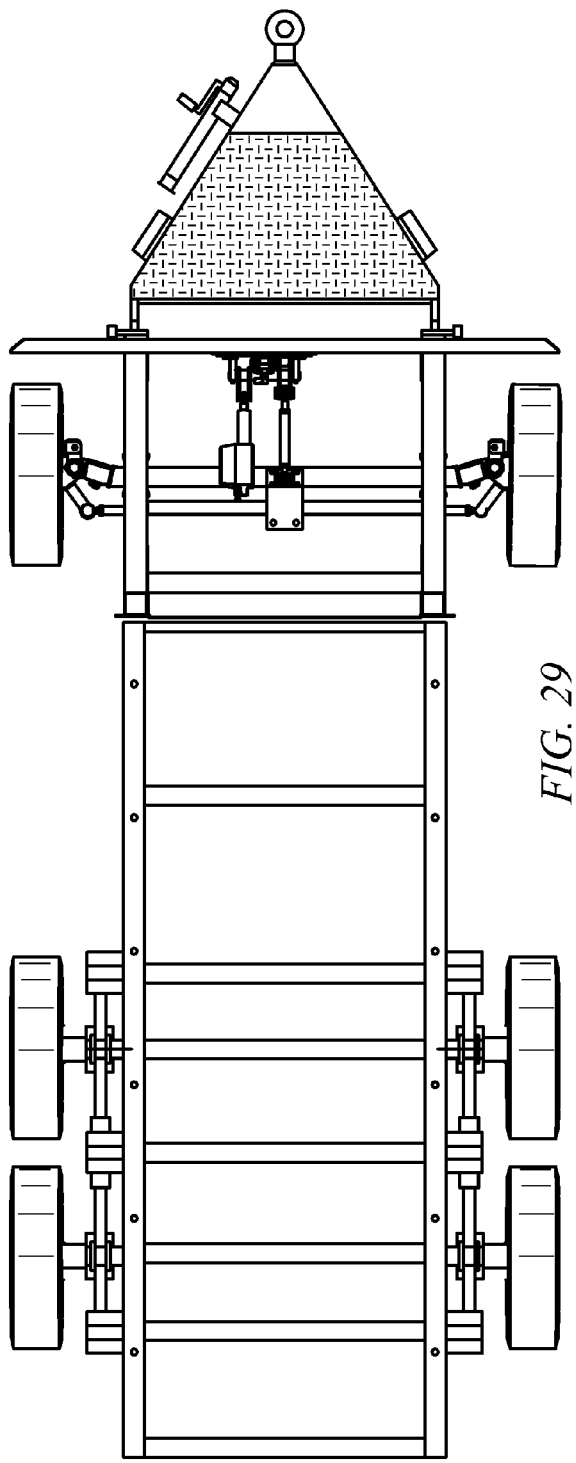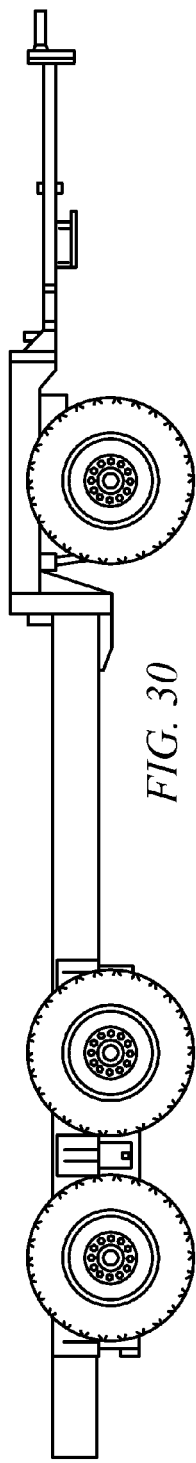
FIG. 29
FIG. 30

SADDLE TYPE SELF-STEER AXLE SYSTEM

CROSS-REFERENCE TO RELATED APPLICATIONS

This application claims priority to and the benefit of U.S. Provisional Application No. 61/527,024 filed Aug. 24, 2011, and is incorporated by reference herein in its entirety.

TECHNICAL FIELD

The present disclosure generally relates to axle systems and, in particular, to self-steer axle systems.

BACKGROUND

A standard three-point trailer generally suffers from several problems. Such trailers may experience proposing (i.e., bouncing up and down) and/or fishtailing. Three-point trailers may suffer from crosswind instability. Also, these types of trailers may have issues related to tongue weight when towing.

SUMMARY

Embodiments of the present disclosure generally provide for self-steer axle systems. Self-steer axle systems according to embodiments of the present disclosure may utilize a self-steer axle mounted on a saddle style hinge system that may maintain the axle hinge centerline coincident with wheel hub centerline. The axle may be mounted and pivot on a horizontal saddle type leaf spring system. This centrally pivoted self-steer axle may be tilted with respect to the trailer subframe with actuating cams and may be powered by its own electronics that may be connected to a tow vehicle electrical system with a seven-way plug.

The steer axle caster angle may be changed from a positive/forward caster to a negative/reverse caster by using the tow vehicle's reverse light. This may enable the trailer to track forward as the tow vehicle is moving forward and track in the reverse direction when the tow vehicle is backing up. This caster reversing self-steer axle centrally pivot system may enable the trailer designers to discontinue using a traditional center axle with a three-point trailer and replace it with a 4-point trailer design.

BRIEF DESCRIPTION OF THE DRAWINGS

For a more complete understanding of this disclosure and its features, reference is now made to the following description, taken in conjunction with the accompanying drawing, in which:

FIG. 29 depicts a top view of a self-steer trailer rolling frame according to an embodiment of the present disclosure;

FIG. 30 depicts a side view of a self-steer rolling frame according to an embodiment of the present disclosure.

DETAILED DESCRIPTION

Saddle type self-steer axle systems according to embodiments of the present disclosure address problems that may be faced with three-point trailers. The front axle may be self-steering in that it may be steered in forward as well as in reverse and may be backed-up. Having such a self-steering front axle may address problems with previous reversing caster steering systems that needed substantial force to reverse the caster as the load on the trailer was to be shifted.

Systems according to embodiments of the present disclosure may provide increased stability as a quad or 4-point design may be more stable than a three-point system because they may provide more than three points of contact. Further, such systems may provide improved weight distribution in that weight may be distributed over four points as opposed to three points. In addition, systems according to embodiments of the present disclosure may provide increased safety by raising the rollover threshold to that of the tow vehicle. Such systems may allow a tow vehicle to carry its full allowable gross weight while towing its full allowable tow weight.

A centrally pivoting saddle style hinge system according to embodiments of the present disclosure may reduce the actuator force that may be needed to change the caster from forward to reverse and vice versa. An actuator lockout mechanism may remove any road bumps to translate back to loading against the actuator reducing its mean time before failure (MTBF). Further, as the electronic system may be enclosed within an actuator body according to embodiments of the present disclosure, this may reduce failure based on external terminal separation.

Systems formed according to embodiments of the present disclosure may include a four-point design and may be backed up due to a reversing caster. Such systems may offer a mechanical advantage through use of a caster changing cam system. Using a lighter and more cost-effective actuator may result in a mechanical isolation system that may avoid impulse/impact-type forces from being transmitted from an axle to an actuator. Further, combining a pivot with a caster changing cam system may result in systems according to embodiments of the present disclosure that may be practical for everyday uses.

Figure 1:
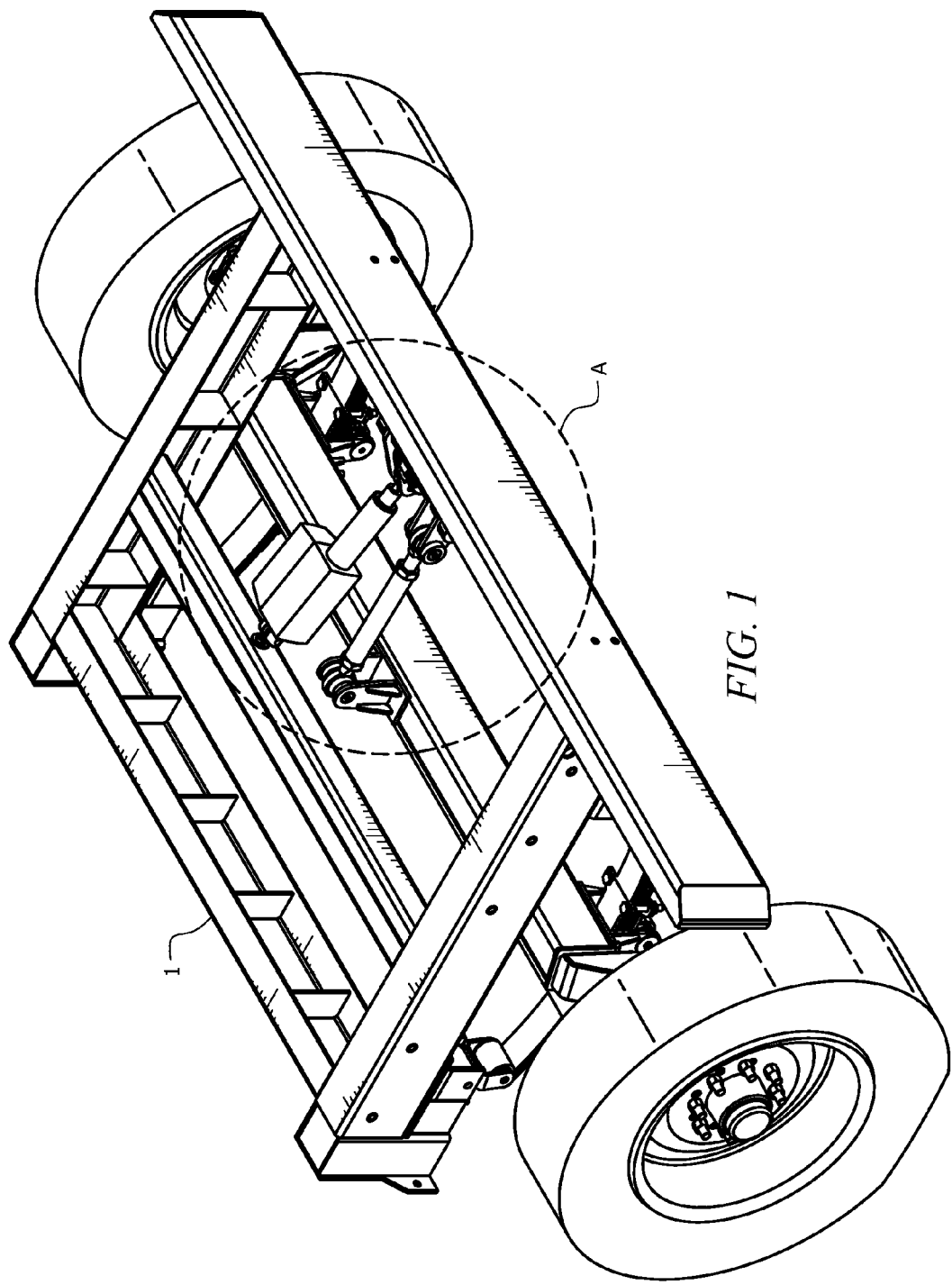
FIG. 1 depicts a system including a main frame and tires/rims according to an embodiment of the present disclosure.
Figure 3:
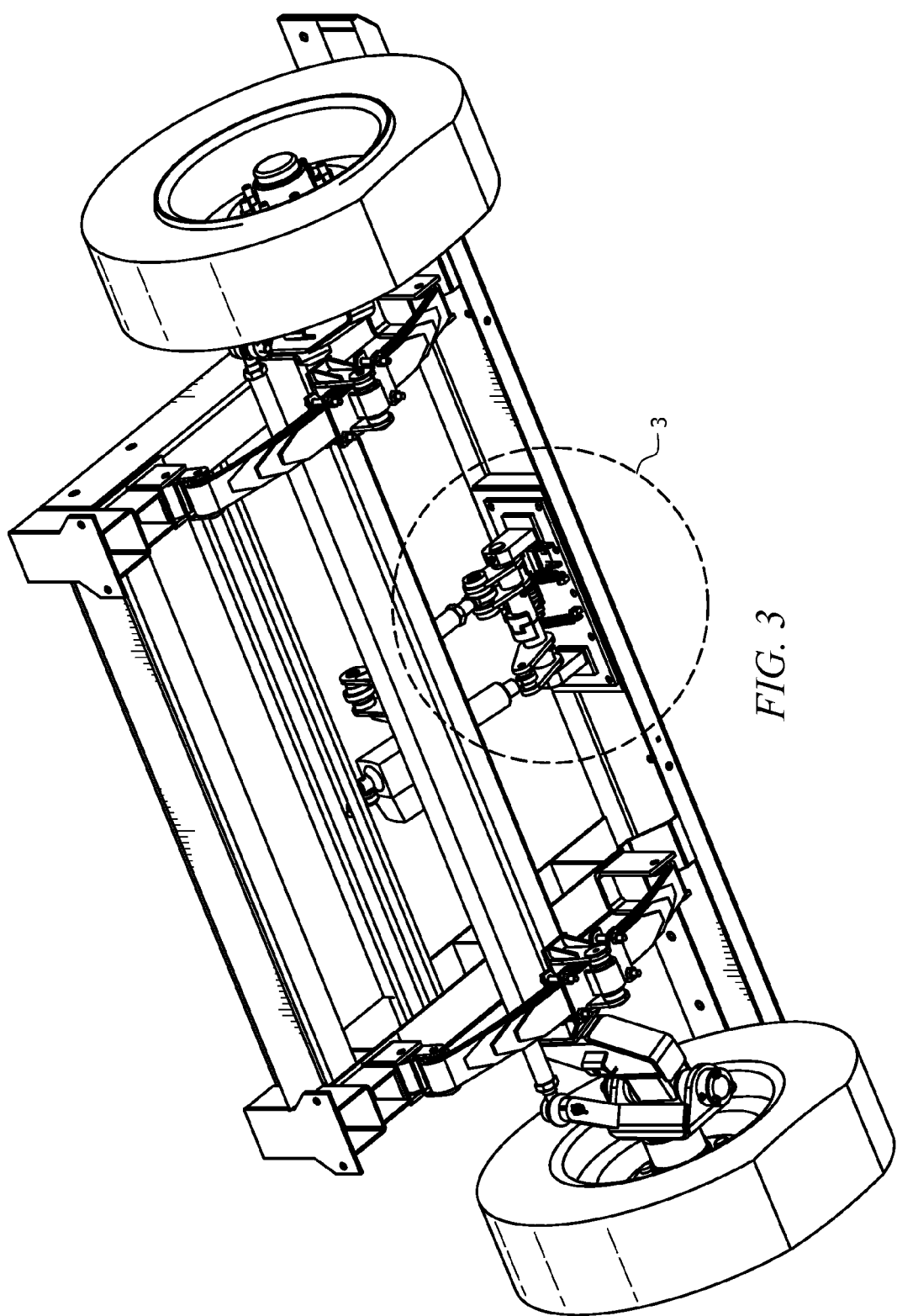
FIG. 3 depicts an alternate view of FIG. 1 according to an embodiment of the present disclosure.
Figure 8:
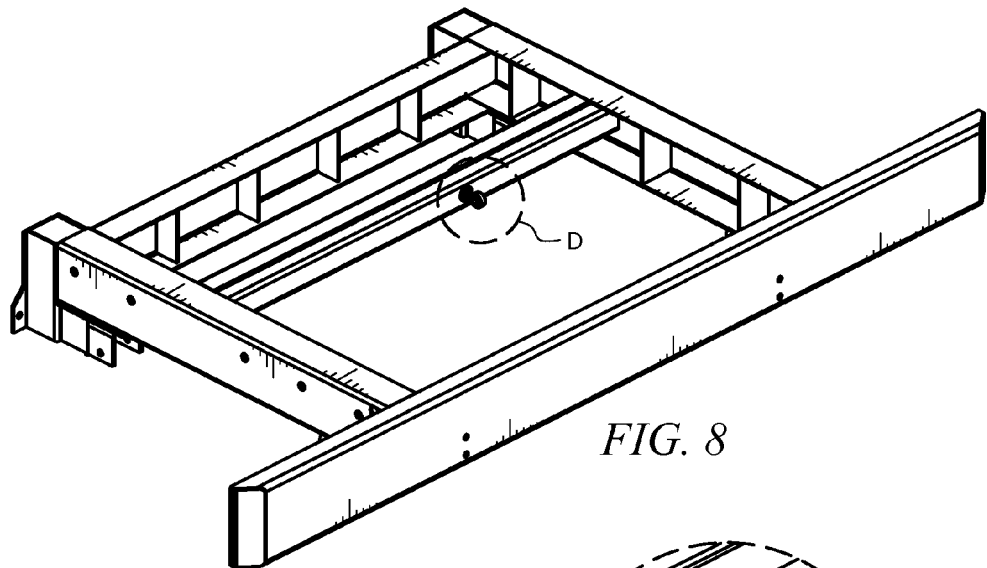
FIG. 8 depicts another perspective view of a main frame according to an embodiment of the present disclosure.

FIG. 1 depicts system including a main frame and tires/rims according to an embodiment of the present disclosure. More specifically, FIG. 1 depicts main frame 1 that may be attached to a trailer frame via connectors or by welding. FIG. 3 depicts an alternative view of the system of FIG. 1, and FIG. 8 depicts another perspective view of a main frame according to an embodiment of the present disclosure. Main frame 1 may be constructed of welded steel pieces forming a box.

Figure 2:
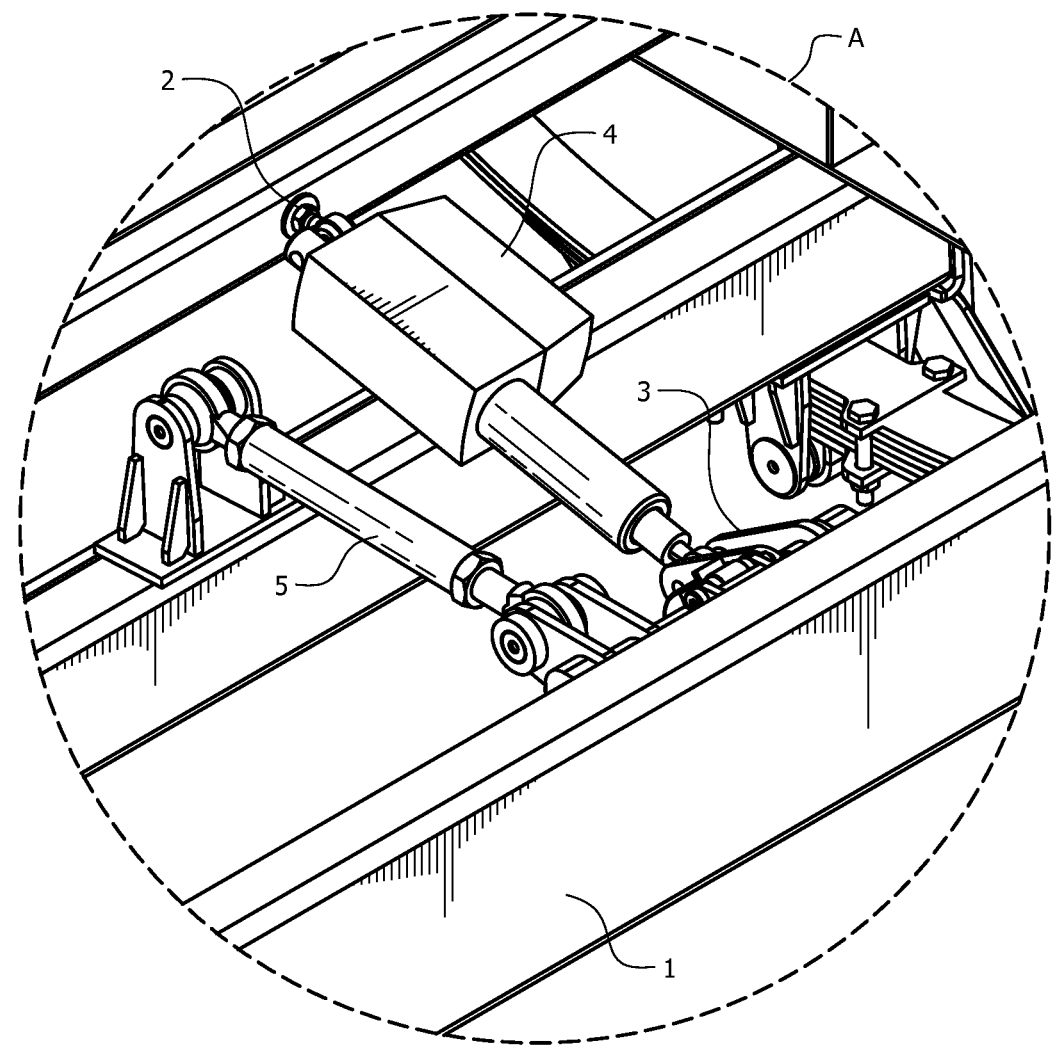
FIG. 2 depicts a close-up view of the portion of the system of FIG. 1 including an actuator hinge bracket, actuator, caster changing cam system and control arm according to an embodiment of the present disclosure.
Figure 9:
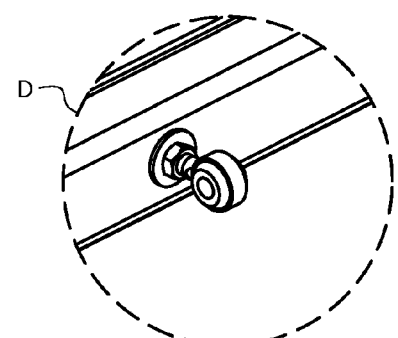
FIG. 9 depicts a close-up view of an actuator hinge bracket depicted in FIG. 8 according to an embodiment of the present disclosure.

FIG. 2 depicts a close-up view of portion A of the system of FIG. 1 including an actuator hinge bracket, actuator, caster changing cam system and control arm according to an embodiment of the present disclosure. Main frame 1 may include actuator 4 that may be connected to pieces of frame 1 via actuator hinge bracket 2 as depicted in FIG. 2. Main frame 1 may house a spherical rod end that may attach to actuator 4. FIG. 9 depicts a close-up view of actuator hinge bracket 2 depicted, for example, in portion D of FIG. 8 according to an embodiment of the present disclosure. Actuator hinge brackets 2, 11 as depicted, for example, in FIGS. 2, 5 and 9, may be attached to main frame 1 with connectors and/or by welding. FIG. 2 also depicts a connection between actuator 4 and caster changing cam system 3. Control arm 5 also may be attached to cam system 3 as depicted in FIG. 2.

Figure 4:
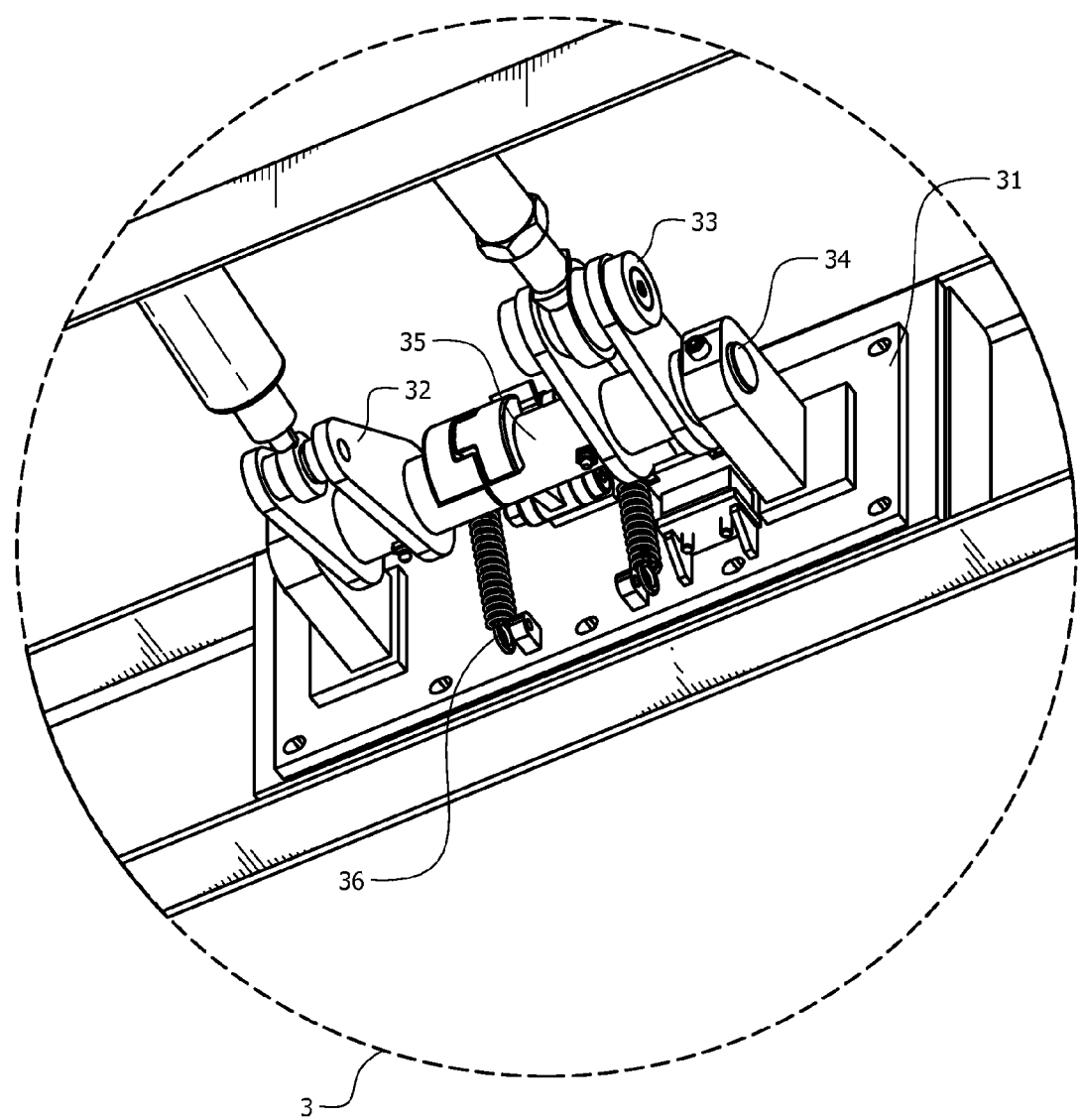
FIG. 4 depicts a close-up view of a caster changing cam system according to an embodiment of the present disclosure.

FIG. 4 depicts a close-up view of FIG. 3 depicting caster changing cam system 3. Actuator 4 may attach to system 3 via a spherical rod end attached to actuator cam arm sub assembly 32. Caster changing cam system 3 may include hinge bracket 31, hinge pin 34, actuator cam arm sub assembly 32, axle cam arm sub assembly 33, lockout mechanism 35, and at least one lockout mechanism tension spring 36.

Figure 5:
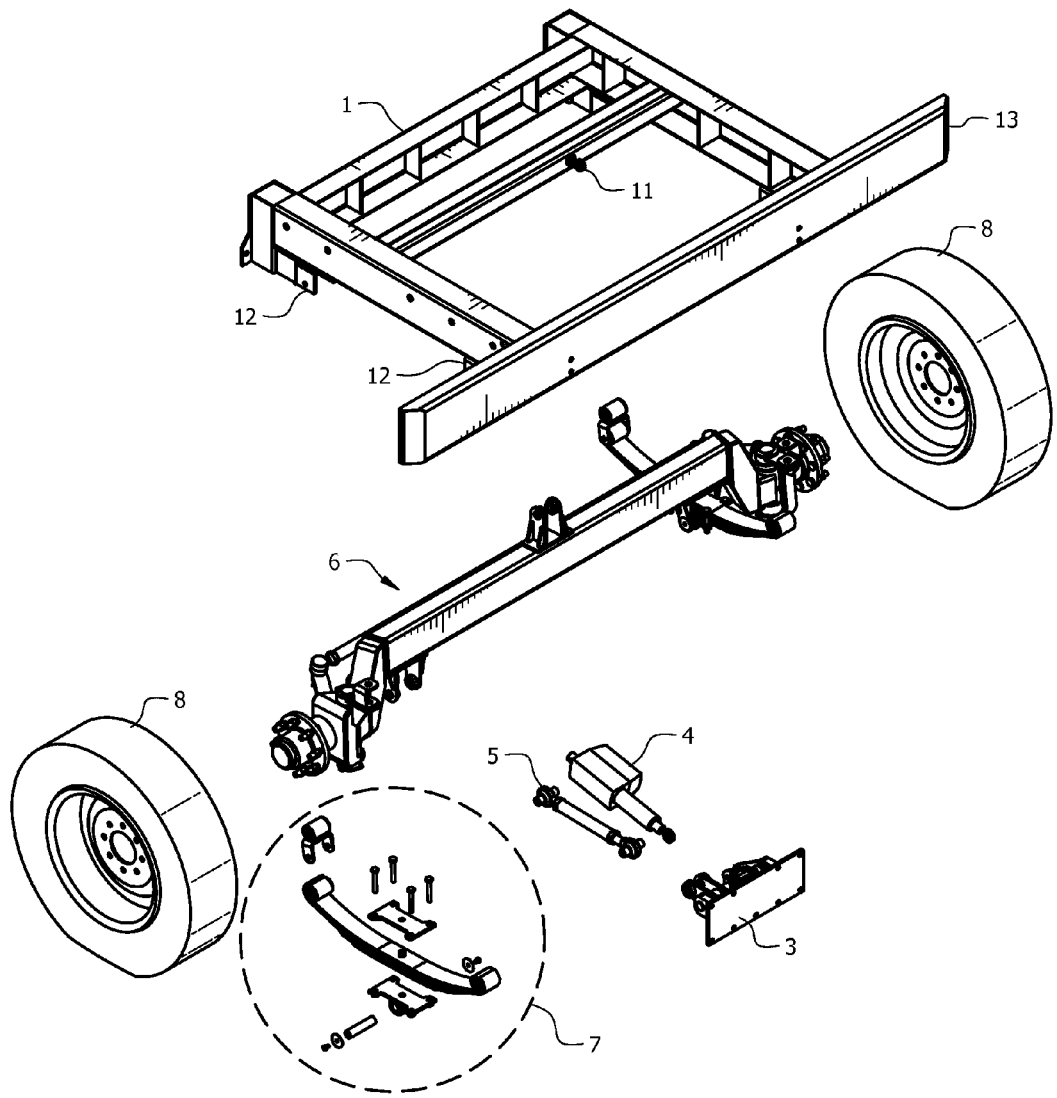
FIG. 5 depicts components of the system of FIG. 1 according to an embodiment of the present disclosure.
Figure 7:
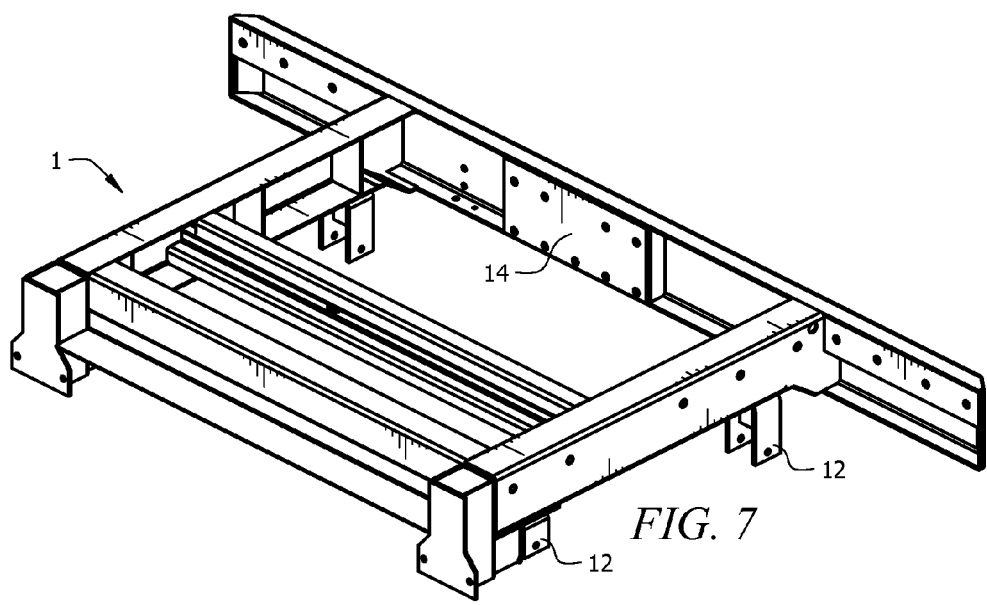
FIG. 7 depicts a perspective view of a main frame according to an embodiment of the present disclosure.

FIG. 5 depicts components of the system of FIGURE according to an embodiment of the present disclosure. Spring hangers 12, frame front bumper 13 and actuator hinge bracket 11 may be joined to main frame 1 via welding and/or connectors. FIG. 5 also depicts tire and rim 8 as well as self-steer axle 6, control arm 5, actuator 4 and caster changing cam system 3 when detached from main frame 1. Tire and rim 8 as depicted in FIG. 5 may be connected to self-steer axle 6 via connectors, such as bolts and lug nuts, through a hub. FIG. 7 depicts a perspective view of a main frame according to an embodiment of the present disclosure and how spring hangers 12 as well as caster system mounting plate 14 may be joined to main frame 1 via welding and/or connectors.

Figure 6:
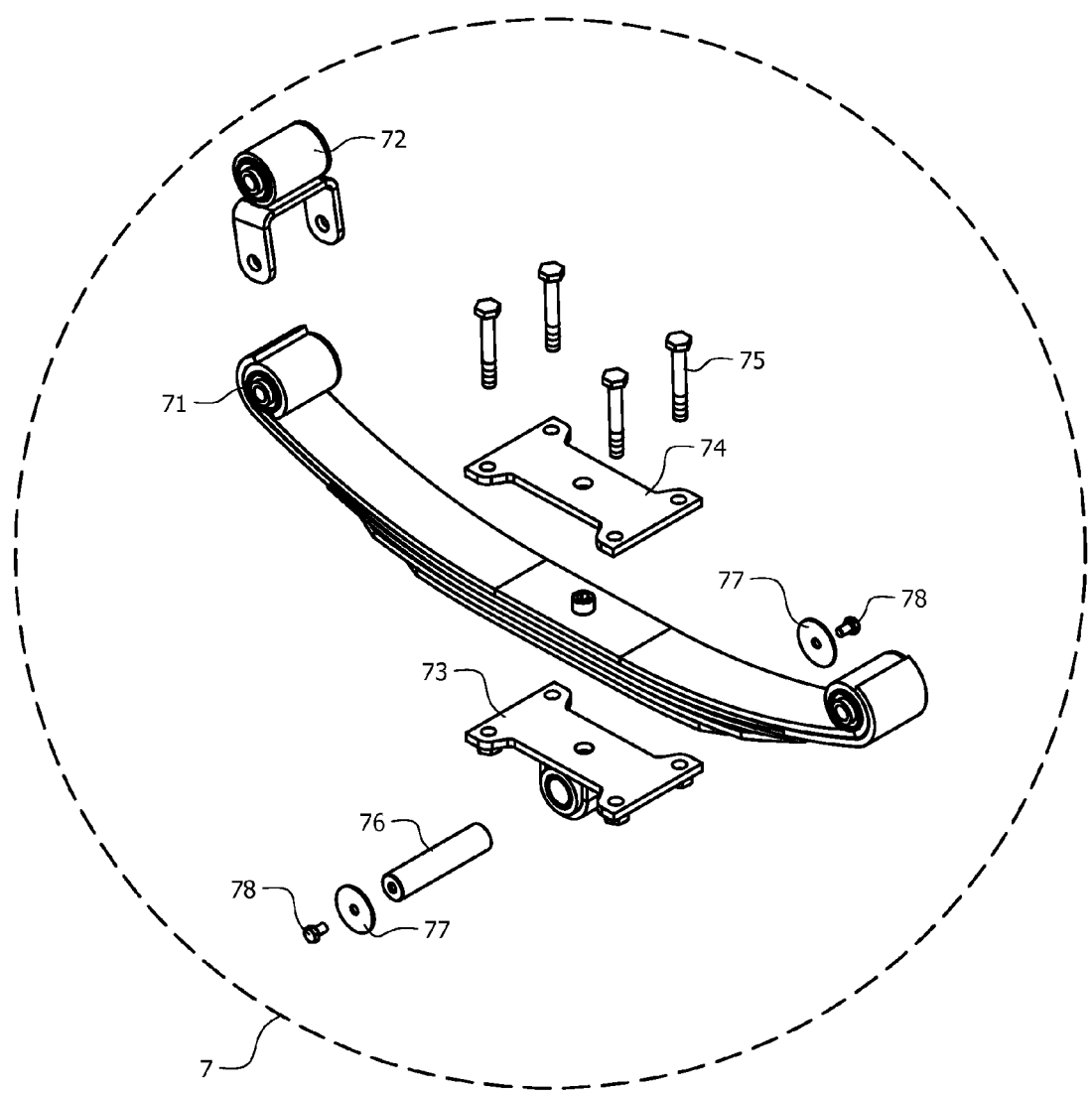
FIG. 6 depicts a close-up view of an axle spring hinge saddle according to an embodiment of the present disclosure.

FIG. 6 depicts a close-up view of axle spring hinge saddle assembly 7 according to an embodiment of the present disclosure. Assembly 7 may include spring 71, spring strap 72, hinge bracket 73, hinge bracket top plate 74, hinge bracket fasteners 75, hinge pin 76, hinge pin end washers 77 as well as bolts 78. Spring 71 may be held in place by hinge bracket top plate 74 and hinge bracket 73 as depicted in FIG. 6, for example, through use of connectors. Hinge bracket 73 may be connected to self-steer axle 6 via hinge pins 76 through hinge bracket 73 and axle saddle hinge bracket 63 as may be depicted in FIGS. 5-6 and 10-11. Spring 71 may be connected to main frame 1 via spring strap 72 as may be depicted in FIG. 6. Spring strap 72 may be connected to main frame 1 with connectors.

Figure 10A:
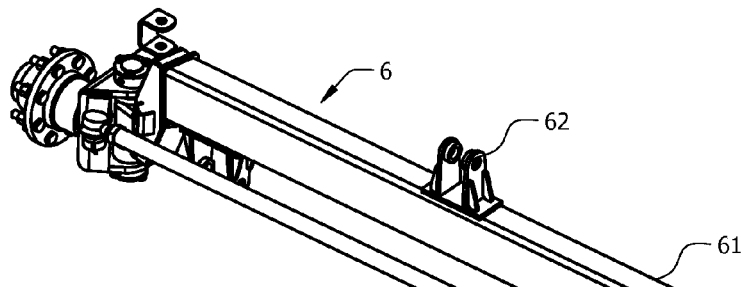
FIG. 10 depicts a self-steer axle assembly according to an embodiment of the present disclosure.
Figure 10B:
Figure 11:
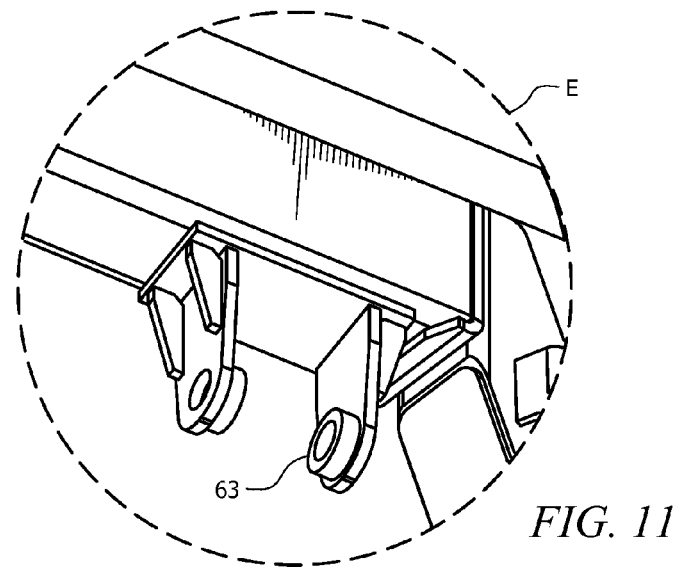
FIG. 11 depicts a close-up view of a self-steer axle assembly according to an embodiment of the present disclosure.
Figure 18:
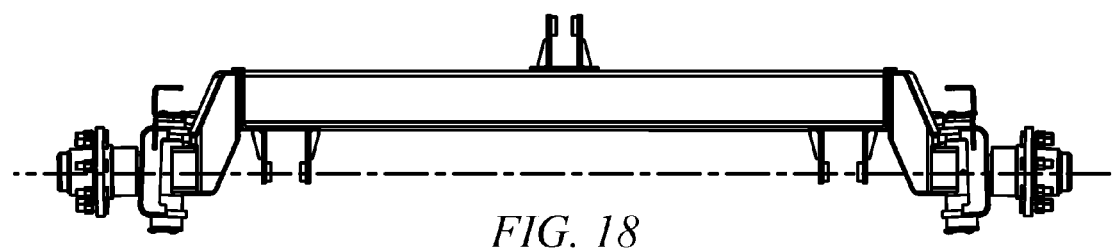
FIG. 18 depicts a front view of a self-steer axle system according to an embodiment of the present disclosure.

FIG. 10 depicts self-steer axle assembly 6 according to an embodiment of the present disclosure. FIG. 18 depicts a front view of a self-steer axle system according to an embodiment of the present disclosure. Control arm 5 may be connected to axle control arm bracket (FIG. 10) located on self-steer axle 6. FIG. 11 depicts a close-up view of a self-steer axle assembly according to an embodiment of the present disclosure. Assembly 6 may include axle sub assembly 61, axle control arm bracket 62 as well as axle saddle hinge bracket 63. Axle control arm bracket 62 and axle saddle hinge bracket may be attached to axle sub assembly 61 via welding and/or through use of connectors.

Figure 12:
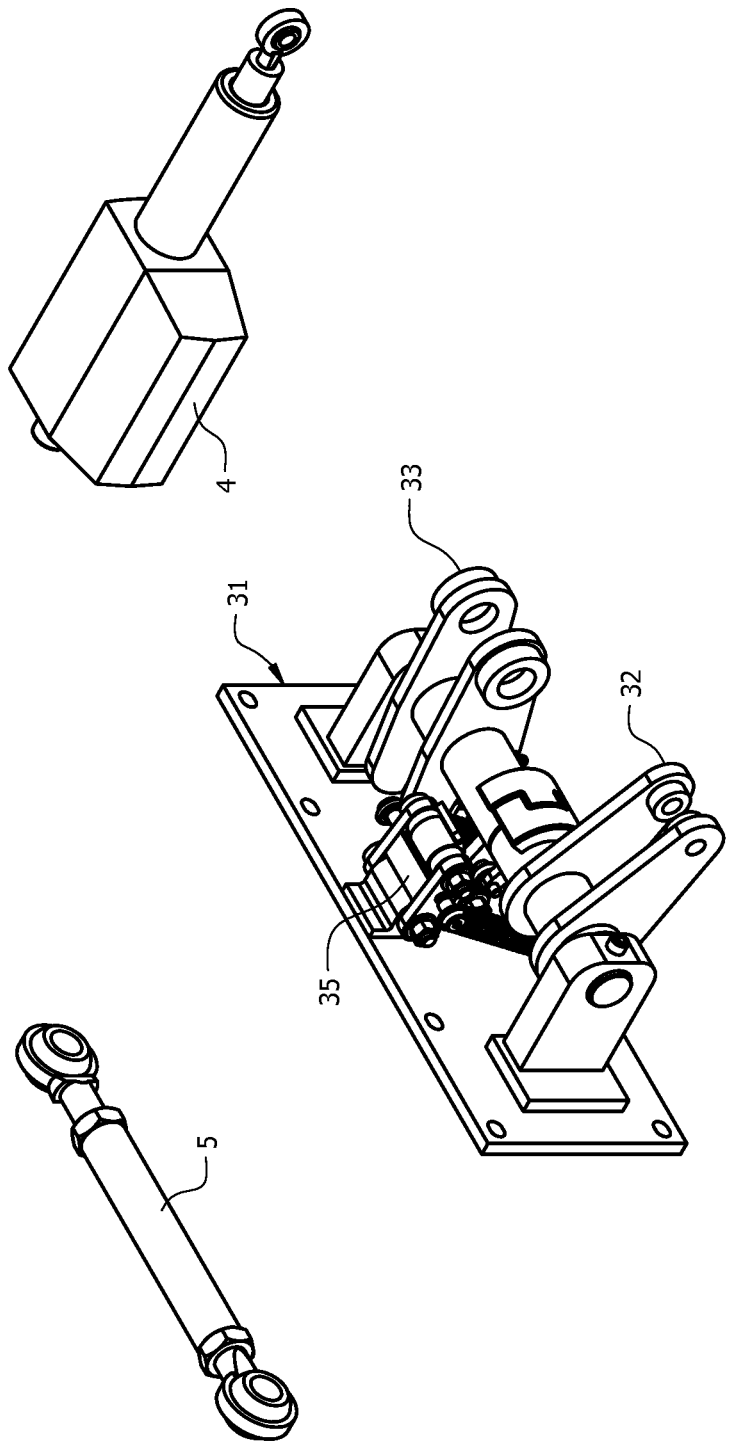
FIG. 12 depicts an actuator, control arm and caster changing cam system according to an embodiment of the present disclosure.

FIG. 12 depicts actuator 4, control arm 5 and caster changing cam system 3 according to an embodiment of the present disclosure. As depicted in FIG. 12, caster changing cam system 3 may include hinge plate 31, actuator cam arm sub assembly 32, axle cam arm sub assembly 33, as well as lockout mechanism 35. Control arm 5 as depicted in FIG. 12 may be connected to axle cam arm sub assembly 33 with a spherical rod end and/or connectors.

Figure 13A:
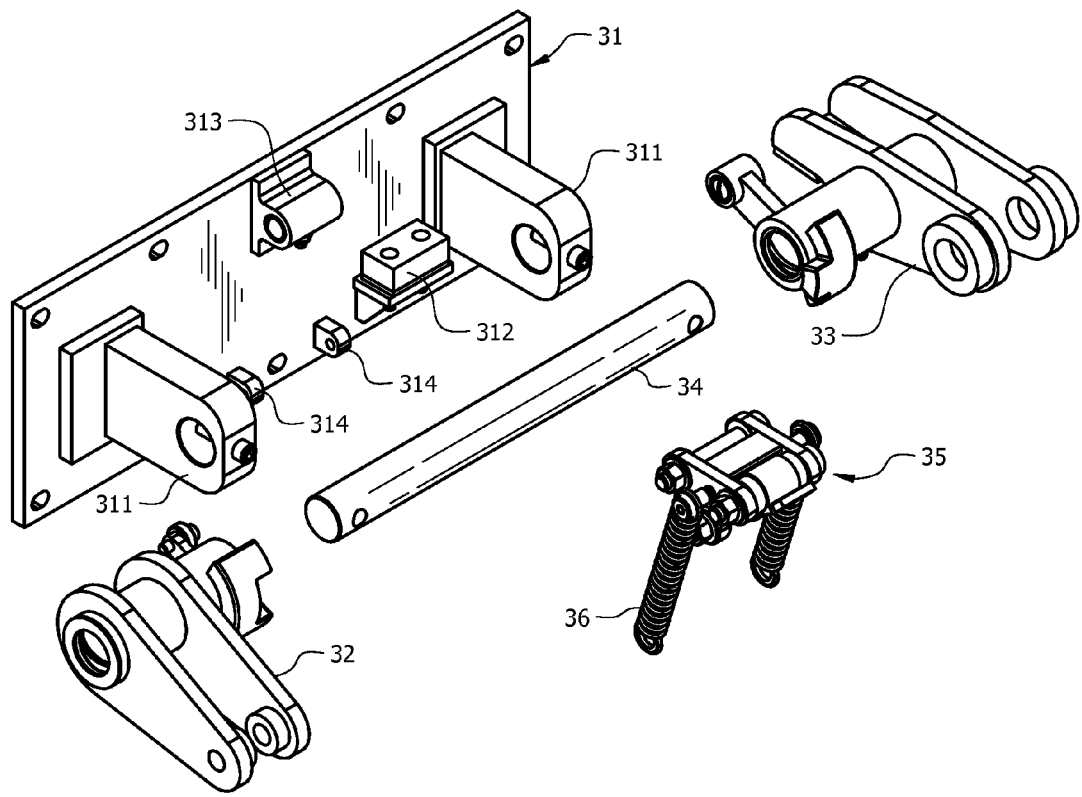
FIGS. 13A and 13B depict a close-up view of components of a caster changing cam system according to an embodiment of the present disclosure.
Figure 13B:
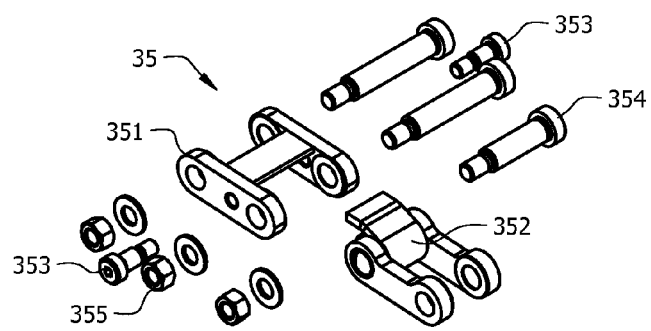

FIGS. 13A and 13B depict a close-up view of components of caster changing cam system 3 according to an embodiment of the present disclosure. Hinge plate 31 may support caster changing cam system 3 and may be connected to caster system mounting plate 14 (depicted in FIG. 7) via connectors. Hinge brackets 311 may be welded to hinge plate 31 and may support hinge pin 34 that may be secured on both ends using hinge brackets 311. System 3 also may include lockout mechanism main hinge 313 and lockout mechanism positive stop 312. Actuator cam sub assembly 32 and axle cam arm sub assembly 33 as depicted in FIGS. 4 and 13 may both slide over hinge pin 34 through a slip-fit relationship. Lockout mechanism 35 may be welded and/or connected using connectors and then attached to axle cam arm sub assembly 33. Lockout mechanism 35 may be attached to hinge plate 31 via springs and/or connectors. Lockout mechanism 35 may include lockout part 351, lockout part 352, spring hold bolt 353, assembly bolts 354, and assembly nuts 355 as depicted in FIG. 13.

Figure 14:
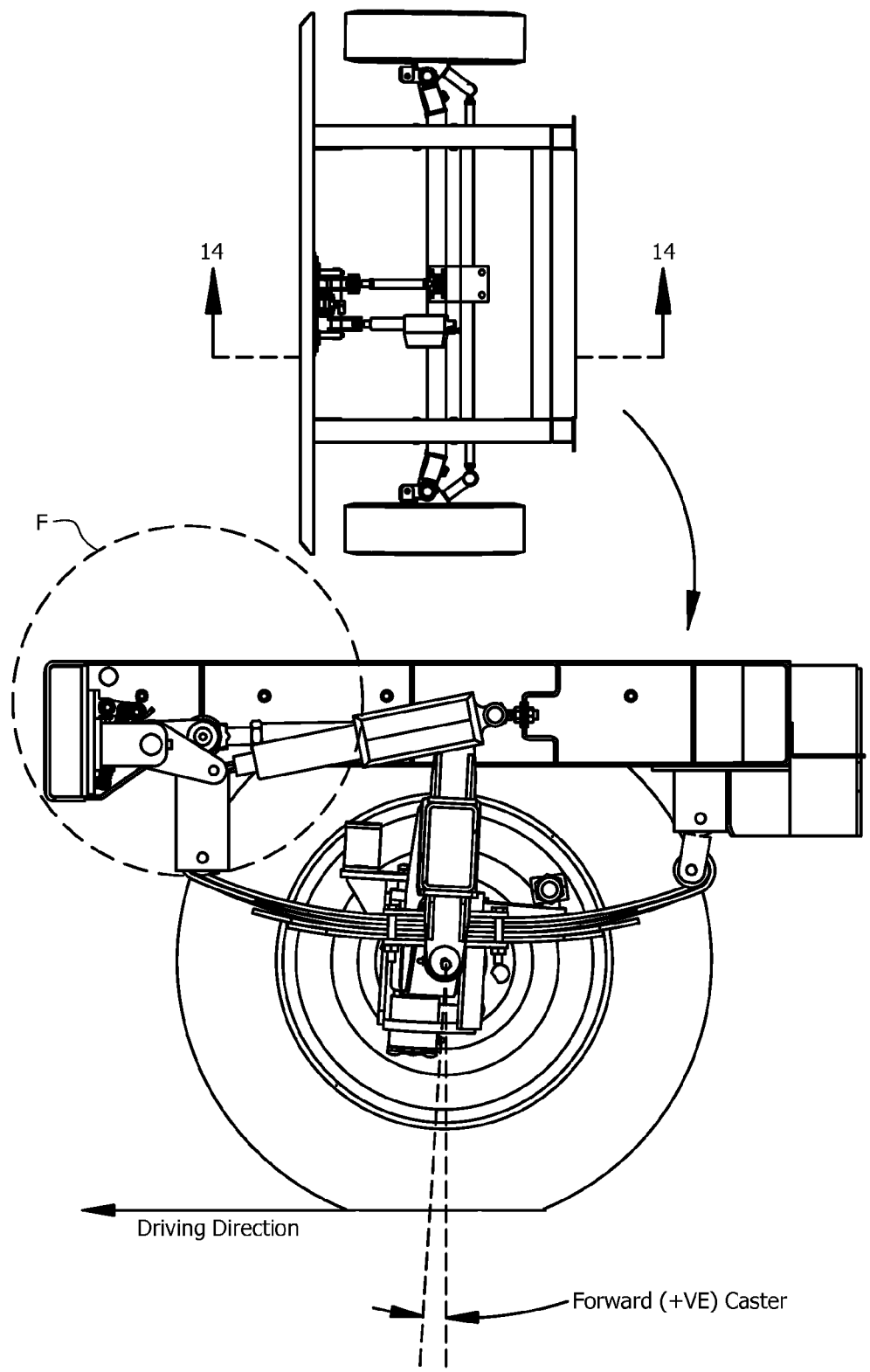
FIG. 14 depicts forward caster position according to an embodiment of the present disclosure.
Figure 15:
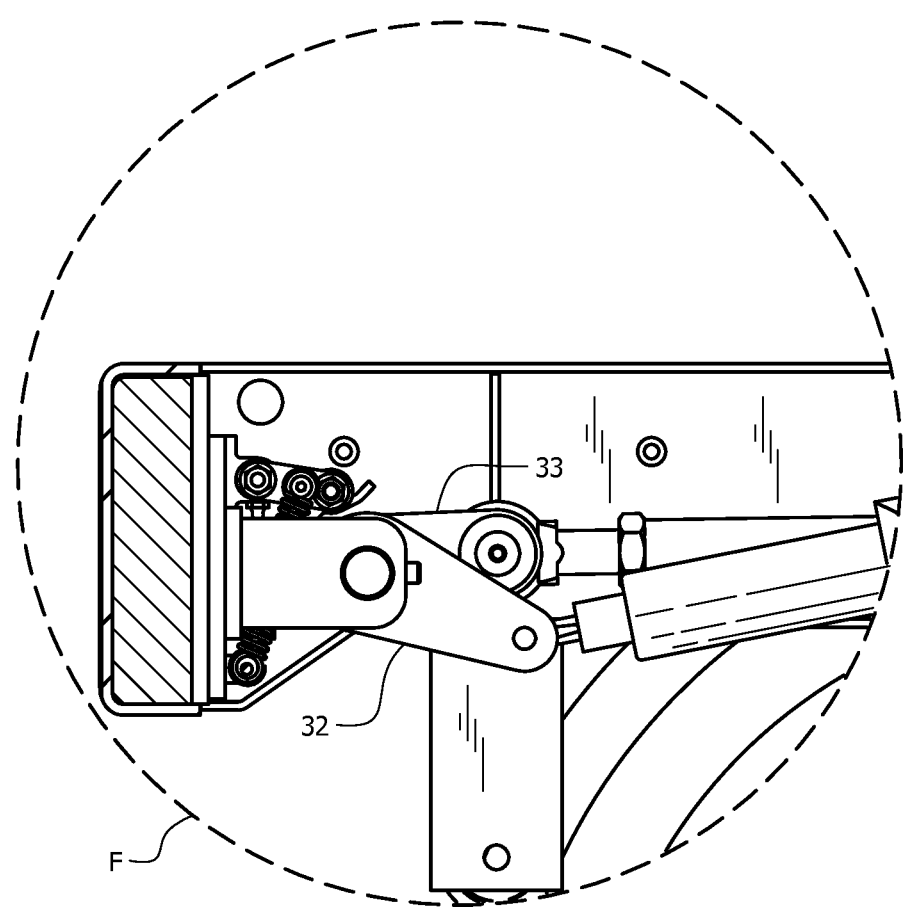
FIG. 15 depicts a cam full forward caster position according to an embodiment of the present disclosure.
Figure 16:
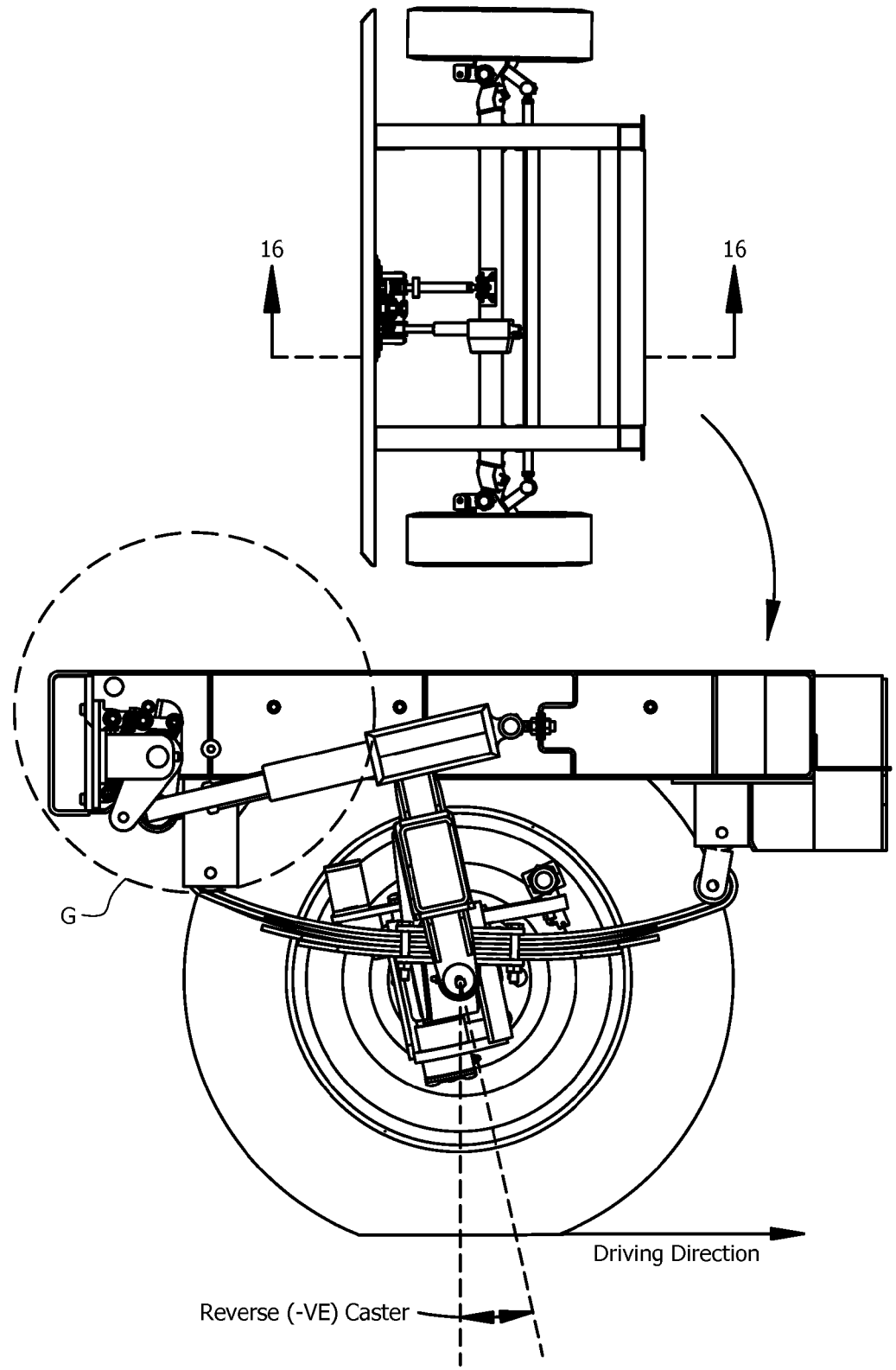
FIG. 16 depicts reverse caster position according to an embodiment of the present disclosure.
Figure 17:
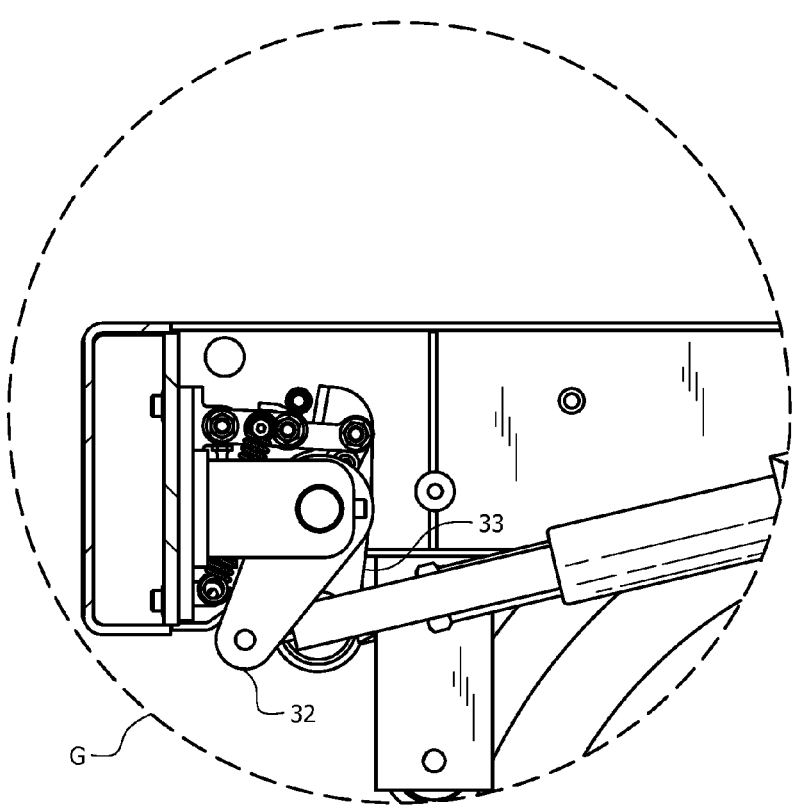
FIG. 17 depicts a cam full reverse caster position according to an embodiment of the present disclosure.

FIG. 14 depicts forward caster position according to an embodiment of the present disclosure, and FIG. 15 depicts a cam at forward caster position according to an embodiment of the present disclosure. Similarly, FIG. 16 depicts reverse caster position according to an embodiment of the present disclosure, and FIG. 17 depicts a cam at reverse caster position according to an embodiment of the present disclosure.

Figure 19:
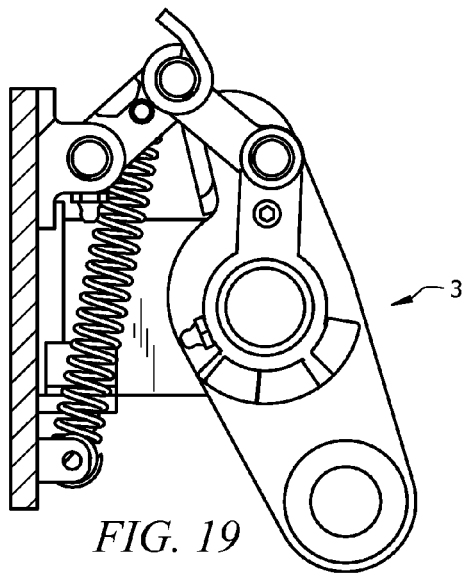
FIG. 19 depicts a cross-sectional profile view of a caster changing cam system mid-stroke in one direction according to an embodiment of the present disclosure.
Figure 20:
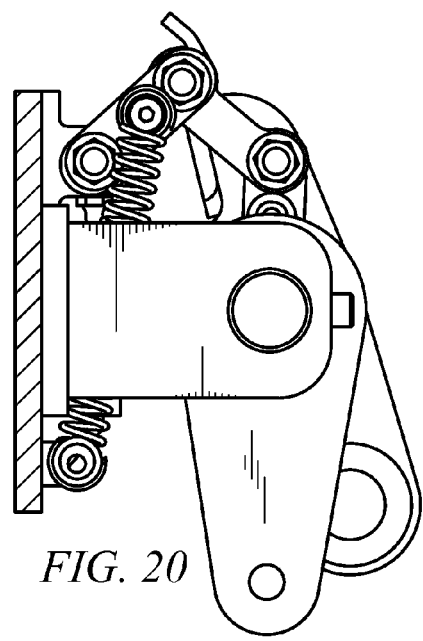
FIG. 20 depicts a profile view of the cross-sectional profile (FIG. 19) cam system mid-stroke in same direction according to an embodiment of the present disclosure.
Figure 21:
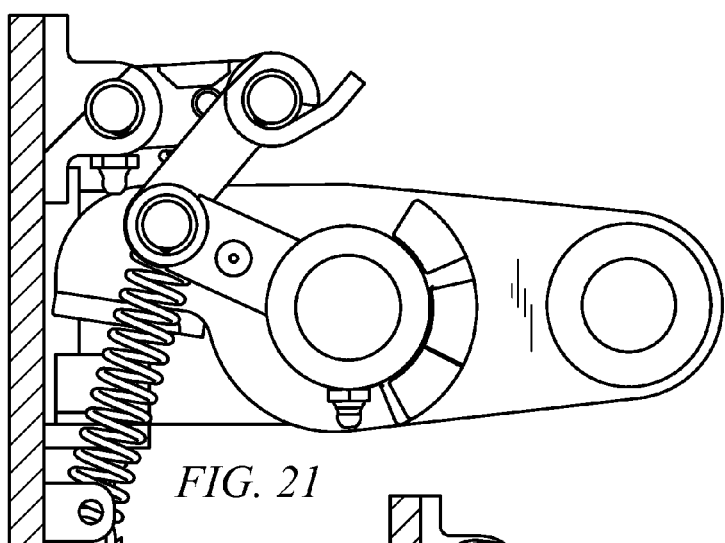
FIGS. 21-22 depict a profile view of a caster changing cam system before the spring pulls the assembly through to full retractor actuator stroke according to an embodiment of the present disclosure.
Figure 22:
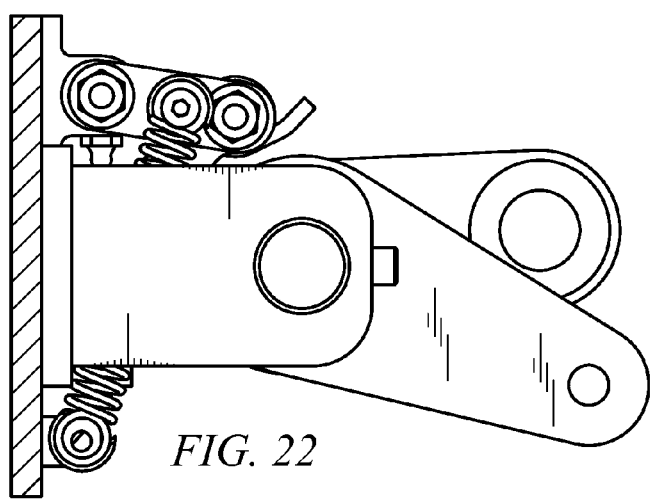
Figure 23:
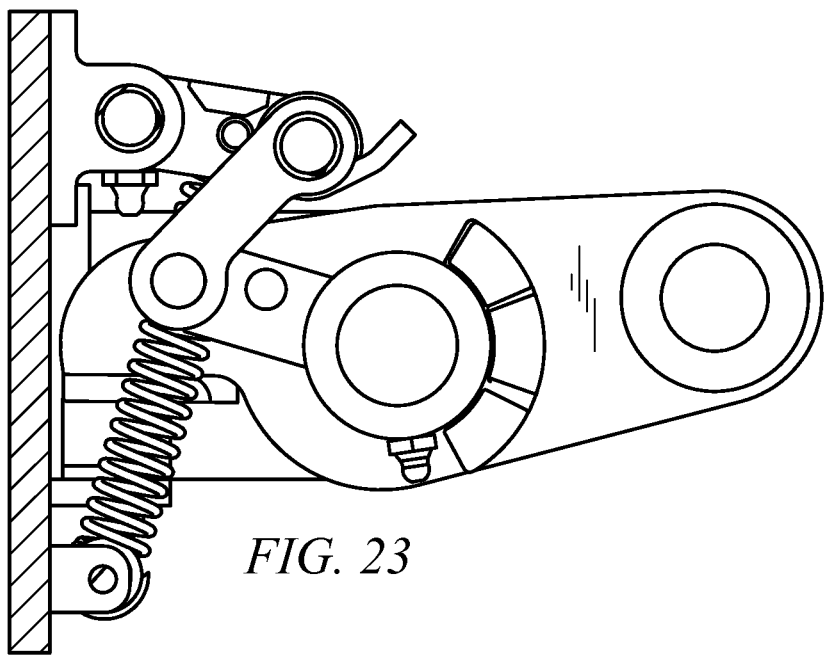
FIGS. 23-24 depict a profile view of a caster changing cam system showing how the spring load may overstroke a control arm sub assembly removing road load from an actuator according to an embodiment of the present disclosure.
Figure 24:
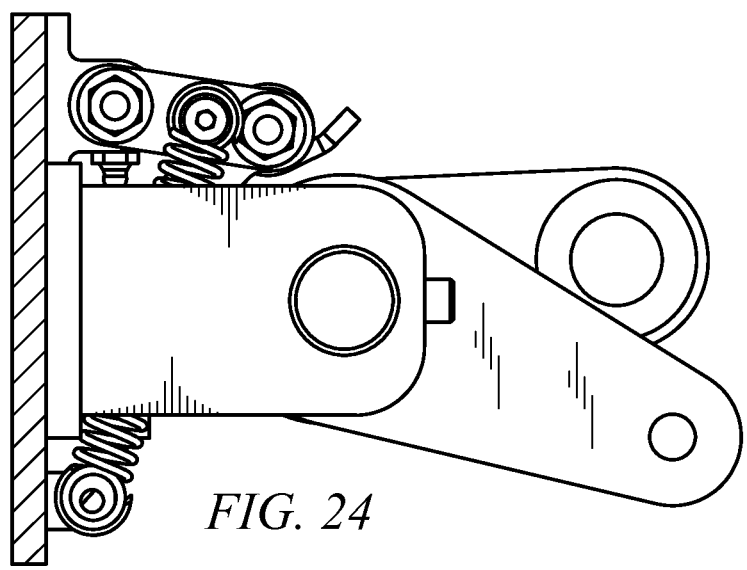
Figure 25:
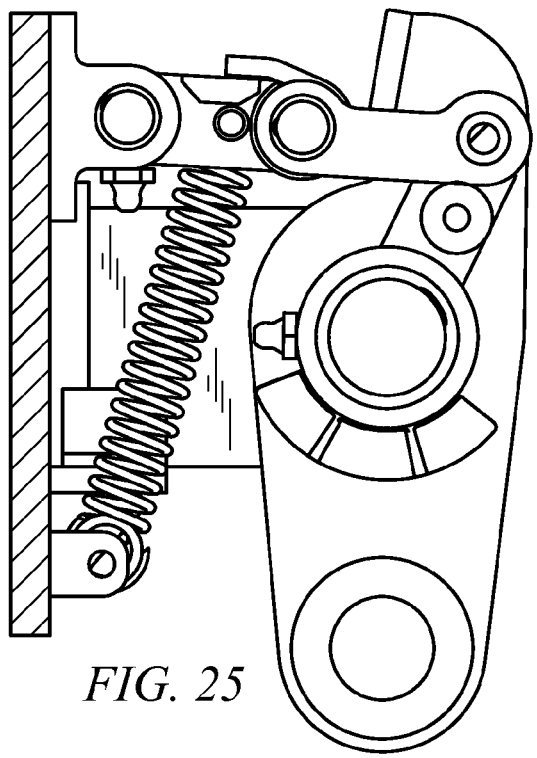
FIGS. 25-26 depict a profile view of a caster changing cam system showing full extended actuator stroke before the spring load "locks out" the rotation of the control arm sub assembly by compressing the strike plates of the lockout mechanism against each other according to embodiments of the present disclosure.
Figure 26:
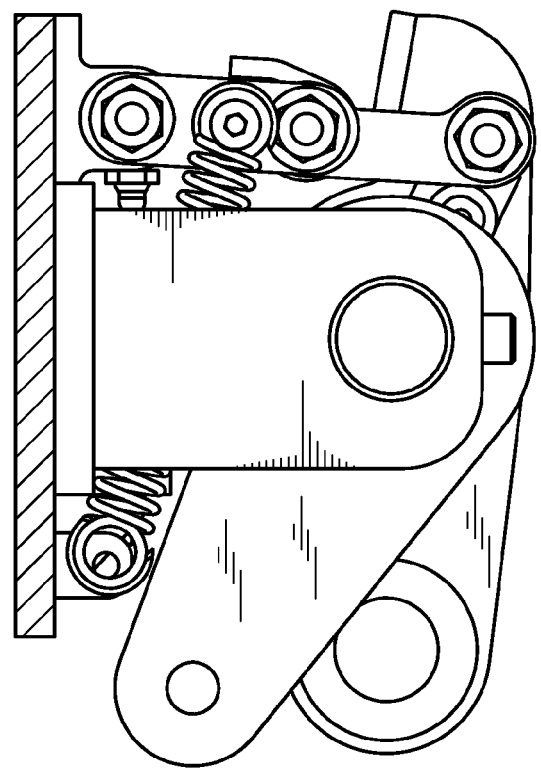
Figure 27:
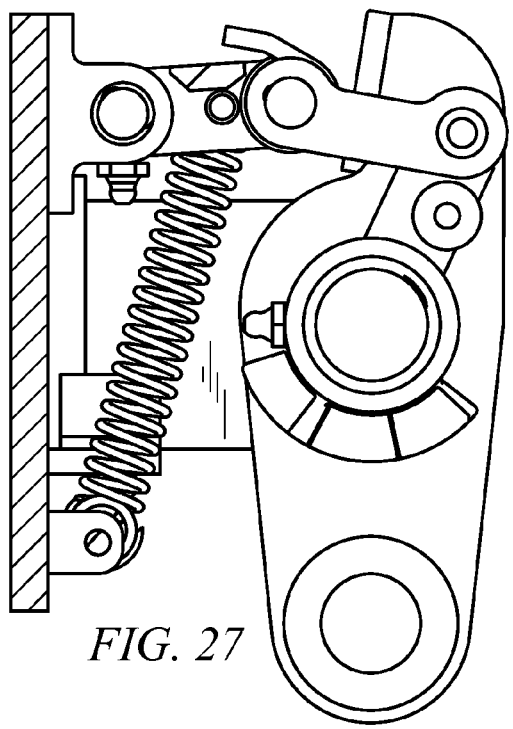
FIGS. 27-28 depict a profile view of a caster changing cam system in the reverse caster position showing a "locked out" lockout mechanism with the strike plates of the two sides of the linkage compressed together according to embodiments of the present disclosure.
Figure 28:
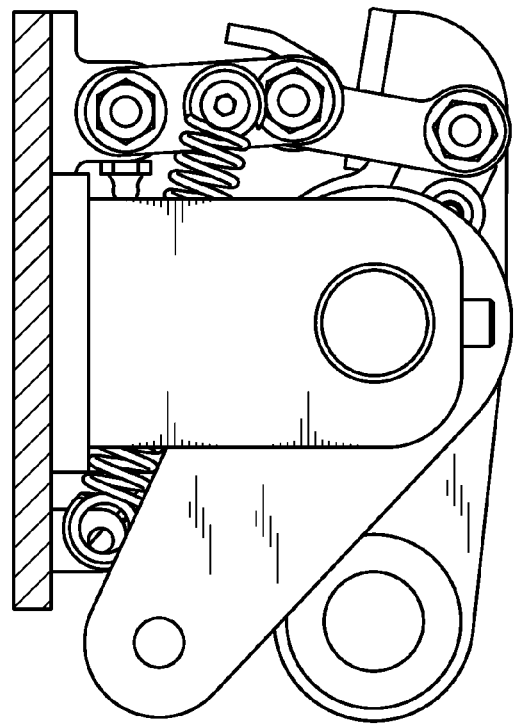

FIG. 19 depicts a cross-sectional profile view of caster changing cam system 3 mid-stroke in one direction according to an embodiment of the present disclosure. FIG. 20 depicts a profile view of caster changing cam system 3 mid-stroke in same direction according to an embodiment of the present disclosure. FIGS. 21-22 depict a profile view of caster changing cam system 3 before the spring pulls the assembly through to full retractor actuator stroke according to an embodiment of the present disclosure. FIGS. 23-24 depict a profile view of caster changing cam system 3 showing how the spring load may overstroke a control arm sub assembly removing road load from an actuator according to an embodiment of the present disclosure. FIGS. 25-26 depict a profile view of caster changing cam system 3 showing full extended actuator during reversing caster movement stroke before the spring load "locks out" the rotation of the control arm sub assembly by compressing the strike plates of the lockout mechanism against each other according to embodiments of the present disclosure. FIGS. 27-28 depict a profile view of caster changing cam system 3 showing a "locked out" lockout mechanism with the strike plates of the two sides of the linkage compressed together according to embodiments of the present disclosure.

Figure 31:
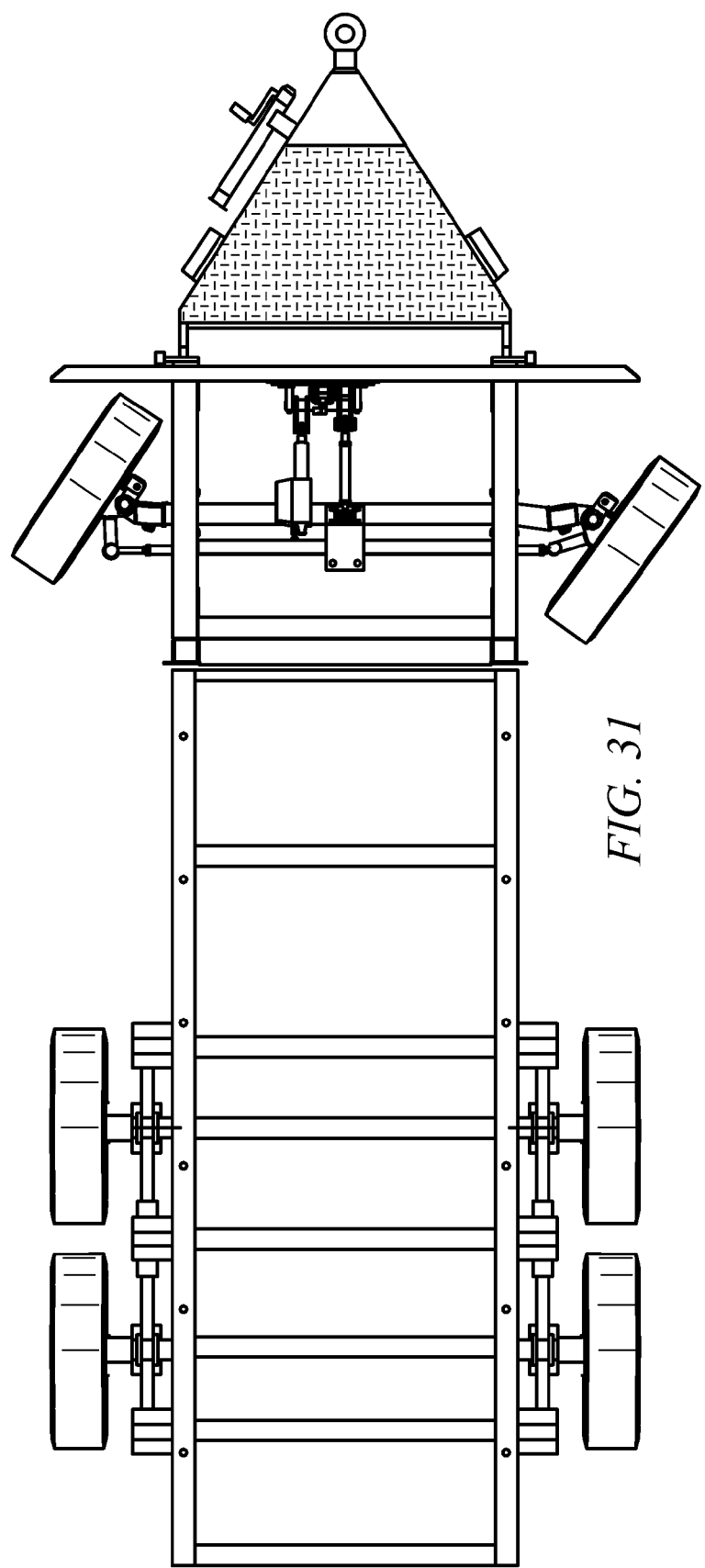
FIG. 31 depicts a top view of a self-steer trailer-rolling frame during a right turn according to an embodiment of the present disclosure.

FIGS. 29-31 depict various views of a self-steer trailer-rolling frame according to embodiments of the present disclosure. More specifically, FIG. 31 depicts a top view of a self-steer trailer-rolling frame during a right turn according to an embodiment of the present disclosure. Main frame 1 may be attached to a self-steer trailer frame and used as a towed vehicle. A power source and a connection to a switch circuit may be used to operate actuator 4 as depicted generally in FIGS. 29-31. The trailer may then be used for any trailer application where the towed vehicle may be asked to carry its own weight. The trailer also may be used to provide higher stability and to be more maneuverable.

When a system formed according to embodiments of the present disclosure is at rest, actuator 4 may be in a compressed state. Caster changing cam system 3 may be rotated so that the ear that attaches to the control arm may be rotated slightly more than 90 degrees from vertical. Self-steer axle 6 may be rotated backward such that the kingpins may project in front of a contact patch of tire 8.

When a system formed according to embodiments of the present disclosure moves to rotate the self-steer axle from a forward direction to a reverse direction, actuator 4 may extend based on one of several signals. Such signals may include a reverse light signal from a tow vehicle, a manual switch located on the outside of the trailer, and/or a switch located on the inside of the driver's cabin. Extension of actuator 4 may cause caster changing cam system 3 to rotate, thereby causing control arm 5 to "pull" self-steer axle 6 forward around its pivot point. The end position of self-steer axle 6 may leave the "projection" of the kingpins to point behind the contact patch of tire 8.

When caster changing cam system 3 is in a forward position, axle cam arm sub assembly 33 may be rotated such that the male notch on its shaft may not have contact with the sides of the female notch on actuator cam arm sub assembly 32. The strike plate on axle cam arm sub assembly 33 may be against positive stop 312 (FIG. 13) mounted to hinge plate 31. Lockout mechanism 35 may be "folded" with at least one lockout mechanism tension spring 36 in a most compressed state. In profile, lockout mechanism 35 may form a "7" shape.

When actuator 4 pushes actuator cam arm sub assembly 32 forward, there may be rotation around hinge pin 34 until the sides of the female notch connect with the male notch on axle cam arm sub assembly 33. Axle cam arm sub assembly may then rotate backward away from positive stop 312 causing lockout mechanism 35 to change positions. The lower portion of lockout mechanism 35 may rotate such that the lower portion of the system may be almost vertical as depicted, for example, in FIGS. 19 and 20. Lockout mechanism tension spring 36 may be stretched to its maximum distance, thereby pulling the upper portion of lockout mechanism 35 down so that the strike plate of each half of the assembly may make full contact with the other. This may form a more rigid assembly with hinge bracket plate 31. This compression of spring 36 may cause axle cam arm sub assembly 33 to rotate so that the male notch of axle cam arm sub assembly 33 may move past contact with the female notch on actuator cam arm sub assembly 32. Actuator cam arm sub assembly 32 may come to rest when it has reached the full stroke of actuator 4 and has generally rotated past about a 6 o'clock position.

To move from reverse to forward, the actuator side of axle cam arm sub assembly 33 may begin to rotate. When this rotation begins, the tab that may be attached to the actuator side of sub assembly 33 may make contact with lockout mechanism 35 and "pop" it so that the control arm side of sub assembly 33 may rotate. Lockout mechanism 35 may rotate such that springs 36 may extend and then pull lockout mechanism 35 back to its original state, being folded up on itself. The control arm side of sub assembly 33 may rotate with the actuator side until the tension of springs 36 may cause it to rotate past the contact point of actuator 4, thereby leaving a small gap in the notch fitting so that no force from control arm 5 may be translated to the actuator side of the cam directly. The control arm side may be left at rest with the positive stop arm of the cam ear resting on rubber pad 312 on hinge plate (FIG. 13).

Systems according to embodiments of the present disclosure may be manufactured using cutting, forming and joining techniques known to one of ordinary skill in the relevant art. Components such as actuator 4 and springs 71 also may be formed using techniques known to one of ordinary skill in the relevant art.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A saddle type self-steer axle system comprising:
a main frame;
an actuator;
a caster changing cam system, the caster changing cam system comprising a hinge bracket, a hinge pin, an actuator cam arm sub assembly, an axle cam arm sub assembly, and a lockout mechanism having at least one lockout mechanism tension spring;
a self-steer axle;
a control arm connecting the self-steer axle and the caster changing cam system; and
an axle spring hinge saddle assembly.

2. The system of claim 1 wherein the main frame houses a spherical rod end that attaches to the actuator.

3. The system of claim 1 wherein the main frame attaches to the actuator via one or more actuator hinge brackets.

4. The system of claim 1 further comprising:
an axle sub assembly and an axle control arm bracket mounted on the self-steer axle.

5. The system of claim 1, the axle spring hinge saddle assembly further comprising:
a spring, a spring strap, a hinge bracket, a hinge bracket top plate, one or more hinge bracket fasteners, a hinge pin, one or more hinge pin end washers, and one or more bolts.

6. The system of claim 5 wherein the hinge bracket is connected to the self-steer axle via the hinge pin through the hinge bracket and the axle saddle hinge bracket.

7. A saddle type self-steer axle system comprising:
a main frame;
an actuator;
a caster changing cam system, the caster changing cam system comprising: a hinge plate, an actuator cam arm sub assembly, an axle cam arm sub assembly, and a lockout mechanism;
a self-steer axle; and
an axle spring assembly.

8. The system of claim 7, the lockout mechanism further comprising:
one or more lockout parts, a spring hold bolt, one or more assembly bolts, and one or more assembly nuts.

9. The system of claim 7 wherein the self-steer axle is mounted on a horizontal saddle type leaf spring system.

10. The system of claim 7 wherein the self-steer axle is tilted with respect to a trailer sub-frame with actuating cams.

11. The system of claim 7 wherein the self-steer axle is powered by its own electronics.

12. The system of claim 7 wherein the self-steer axle changes from a positive/forward caster to a negative/reverse caster through use of a reverse signal.

13. A saddle type self-steer axle system comprising:
an actuator;
a self-steer axle;
an axle spring hinge saddle assembly; and
a caster changing cam system including a lockout mechanism having at least one lockout mechanism tension spring, one or more lockout parts, at least one spring hold bolt, at least one assembly bolt, and at least one assembly nut.

14. The system of claim 13, the caster changing cam system further comprising:
a hinge bracket, at least one hinge pin, an actuator cam arm sub assembly, and an axle cam arm sub assembly.

15. The system of claim 14 wherein the lockout mechanism attaches to the axle cam arm sub assembly.

* * * * *